United States Patent [19]
Engdahl et al.

[11] Patent Number: 6,124,595
[45] Date of Patent: Sep. 26, 2000

[54] GAMMA RAY IMAGING DETECTOR WITH THREE DIMENSIONAL EVENT POSITIONING AND METHOD OF CALCULATION

[76] Inventors: John C. Engdahl, 2929 The Concord Ct., Ellicott City, Md. 21042; Glenn F. Knoll, 3891 Waldenwood, Ann Arbor, Mich. 48105; William L. Rogers, 1425 Cambridge, Ann Arbor, Mich. 48104

[21] Appl. No.: 08/307,075

[22] Filed: Sep. 16, 1994

[51] Int. Cl.[7] .................................................. G01T 1/20
[52] U.S. Cl. ...................................... 250/366; 250/370.11
[58] Field of Search ................................ 250/366, 370.11

[56] References Cited

U.S. PATENT DOCUMENTS 4,303,860  12/1981  Bjorkholm et al. ................ 250/363.02
4,437,007   3/1984  Koslow et al. .......................... 250/366

FOREIGN PATENT DOCUMENTS 1-229995   9/1989   Japan ................................ 250/370.11

*Primary Examiner*—Constantine Hannaher
*Attorney, Agent, or Firm*—Rothwell, Figg, Ernst & Manbeck

[57] ABSTRACT

A gamma ray imaging detector for nuclear medical imaging includes an array of photodiode detectors provided on opposite surfaces of a scintillating crystal. By measuring the relative distribution of detection signal intensities produced by each photodiode in each array, it becomes possible to measure the depth of interaction of a gamma ray absorption event along the Z axis direction of the crystal in addition to its spatial position in the X-Y plane of the crystal and its absorption energy. The value of the measured depth of interaction is subsequently used in refining the calculation of the spatial location and improving the performance characteristics of the imaging detector.

13 Claims, 1 Drawing Sheet

GAMMA RAY IMAGING DETECTOR WITH THREE DIMENSIONAL EVENT POSITIONING AND METHOD OF CALCULATION

BACKGROUND OF THE INVENTION

1. Field of the Invention

The present invention relates generally to imaging devices for nuclear medicine, and more specifically relates to gamma-ray or scintillation cameras and methods of obtaining images from radiation data acquired by such cameras by measuring the position of a radiation event in not only the x-y plane but also in the z plane.

2. Background and Prior Art

A gamma-ray or scintillation camera as utilized in nuclear medicine is a well known device. The original scintillation camera or "Anger camera" (named after the inventor) is described in U.S. Pat. No. 3,011,057. The Anger camera uses a scintillation crystal, such as a NaI(Tl) crystal, which absorbs incident gamma rays from the object under study and interacts with the gamma ray to produce light events. An array of photomultiplier tubes is placed adjacent to the crystal in order to detect and amplify these light events so as calculate the spatial location and energy level of the incident gamma ray to produce a two dimensional image of the object which then may be displayed on a CRT or printed as a hard copy.

When a nuclear medical image is being acquired, a radioisotope has been introduced into the body as a radiopharmaceutical having an affinity for certain parts or organs of the body, and the diagnostician is interested in the distribution of that radiopharmaceutical within the body or organ under evaluation. It is therefore desirable that the image accurately represent the spatial distribution of the radiation emitted from the body. When radioactive nuclei decay, a gamma-ray or high energy X-ray is emitted from the location of the decay. The gamma-rays (or X-rays) travel in a straight line until they are either scattered or absorbed. If a gamma-ray is absorbed in the scintillation crystal of the camera and detected as a light event without having undergone an intervening scattering event, then the location at which the gamma-ray was detected represents the actual location of the decay, and hence part of the distribution of the radioisotope. Such an event is considered a "good" detected event and is used to form an accurate picture of the radioisotope distribution within the body. However, if the gamma-ray scatters within the body at some point between its emission from the location of decay and its detection in the scintillation crystal, then the location at which the scattered gamma-ray is detected does not represent the location from which the gamma-ray was emitted, and thus the inclusion of such an event in the image will falsely indicate the presence of radioisotope where, in actuality, there may not have been any radioisotope. Such an event is known as a "bad" event.

The phenomenon by which a gamma-ray collides with an electron (of an atom of the body, for example), loses some of its energy and changes its direction of travel is known as Compton scattering. Because the scattered gamma-ray energy is lower than the energy of the unscattered gamma-ray, it is the energy of a gamma-ray event that is used to discriminate among detected gamma-ray events so as to include only unscattered gamma-ray events in the image being acquired. When a single gamma-ray is absorbed in the scintillation crystal, a fraction of the deposited energy is emitted as scintillation photons which have wavelengths within the visible spectrum. Because the scintillation photons are emitted isotropically from the point of absorption, only a small amount of the emitted photons reach the photomultiplier tubes (PMTs). The fraction of the total amount of photons reaching the photomultiplier tubes that produces an electrical signal in any one photomultiplier tube is dependent on the position of that photomultiplier tube relative to the location of the light event, local variations in physical properties of the crystal, reflective surfaces, other transparent media such as lightpipes, and the interfaces between all of these materials and the boundaries of the detector. Additionally, the probability that a scintillation photon entering a photomultiplier tube will be converted into an electrical pulse is dependent on local variations in the photocathode of the photomultiplier tube. This probability is known as the quantum efficiency of the photocathode. The quantum efficiency is highly dependent on the thickness and composition of the photocathode, and is thus variable from PMT to PMT as well as locally within a PMT.

An alternative to the sodium iodide crystal-PMT type gamma ray camera is disclosed in U.S. Pat. No. 5,171,998, issued Dec. 15, 1992 to two of the present inventors. The disclosure of the '998 patent is incorporated by reference herein in its entirety. The '998 patent describes a gamma ray imaging detector having a scintillating crystal made of CsI(Tl) (thallium-doped cesium iodide) instead of NaI(Tl), and also including an array of photodiodes arranged on one side of the scintillating crystal opposite the side which receives incident gamma rays, for receiving scintillation photons produced by the interaction of the incident gamma ray with the crystal. A light reflective surface overlies the surface of the crystal opposite the photodiode array.

As described in the '998 patent, the CsI(Tl) crystal exhibits a higher scintillation photon yield than NaI(Tl), albeit in the 580 nanometer wavelength range, as opposed to the 415 nanometer range for NaI (in which PMTs are more sensitive to incident photons). However, when combined with the use of low noise, low capacitance photodiode detectors, which have a higher quantum efficiency than conventional photomultiplier tubes in the 580 nanometer range, the alternative gamma ray imaging detector disclosed in the '998 patent achieves an energy resolution significantly improved over the conventional PMT-type detector.

Conventionally, the measurement of the spatial location of a detected gamma ray absorption event in the scintillating crystal has been limited to a two-dimensional point in the X,Y plane of the crystal. However, because the number of scintillation photons reaching each detector element (either a PMT or a photodiode) is dependent on the solid angle subtended by the area of that detector element to the point of the gamma ray absorption within the crystal, the amount of scintillation photons received by each detector is also a function of the depth of interaction (DOI) of the incident gamma ray within the crystal, i.e., along the Z axis of the crystal. The DOI is an important parameter when applied to imaging detector geometries in which the directions from which incident gamma rays impinge upon the crystal are not all substantially normal to the crystal surface. If incident gamma rays intersect the crystal from directions not normal to the crystal, the unknown depth of interaction of those gamma rays within the crystal will result in an additional uncertainty in the measured position of the interaction because of the parallax effect, if only a two dimensional (i.e., X,Y) spatial location is calculated for such an absorption event. A detailed explanation of the importance of and the problems associated with the DOI is provided in "Maximum Likelihood Positioning in the Scintillation Camera Using Depth of Interaction," D. Gagnon et al., IEEE Transactions on Medical Imaging, Vol. 12, No. 1, March 1993, pp. 101–107.

Consequently, there exists a need in the art for a gamma ray imaging detector which is capable of measuring not only the spatial location of gamma ray absorption events in a scintillating crystal in terms of X,Y coordinates, but which is also capable of measuring the depth of interaction of the event within the crystal in the Z axis direction, so as to improve the accuracy and performance of the imaging function.

SUMMARY OF THE INVENTION

The present invention solves the problems noted above and represents a significant advance in the art, by providing a gamma ray imaging detector comprising a scintillating crystal responsive to an incident gamma ray for producing a plurality of scintillation photons, a first array of photodiodes being positioned adjacent one surface of said scintillating crystal for receiving a first portion of said plurality of scintillation photons, and a second array of photodiodes being positioned adjacent a second surface of said scintillating crystal opposite said one surface for receiving a second portion of said plurality of scintillation photons. By providing arrays of photodiodes on both sides of the scintillating crystal, the present invention enables the measurement of the depth of interaction of the gamma ray absorption within the crystal, in addition to the two-dimensional X,Y location of the absorption event and the energy of the absorbed gamma ray.

According to another aspect of the invention, there is provided a method of measuring the depth of interaction of an incident gamma ray within a scintillating crystal of a gamma ray imaging detector, said interaction resulting in the generation of a plurality of scintillation photons, comprising the steps of providing a first array of photodiodes adjacent a first surface of said scintillating crystal so as to receive a first portion of said plurality of scintillation photons, providing a second array of photodiodes adjacent a second surface of said scintillating crystal opposite said first surface so as to receive a second portion of said plurality of scintillation photons, each of said photodiodes in said first and second arrays generating an electrical output signal proportional to the number of scintillation photons received, and calculating the depth of interaction of said incident gamma ray within said scintillating crystal as a function of the amplitudes of said electrical output signals generated by said first and second arrays of photodiodes.

BRIEF DESCRIPTION OF THE DRAWINGS

The present invention will become more fully understood from the detailed description given hereinbelow and the accompanying drawings, which are given for purposes of illustration only and thus are not limitative of the present invention, and wherein.

DETAILED DESCRIPTION OF THE PREFERRED EMBODIMENT

Figure 1:
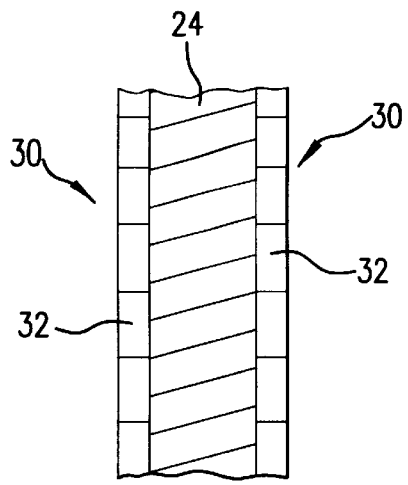
FIG. 1 is a fragmentary sectional view of a gamma ray imaging detector crystal and associated photon detectors according to a preferred embodiment of the present invention.
Figure 2:
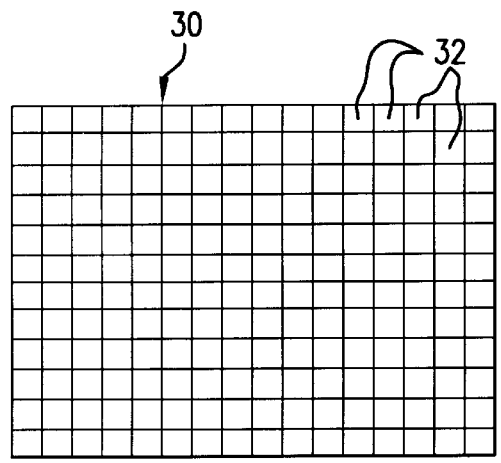
FIG. 2 is a plan view of the photodiode array 30 of FIG. 1.

According to one preferred embodiment of the present invention, a scintillating crystal 24 is provided as shown in FIG. 1, which is preferably CsI(Tl) (thallium-doped cesium iodide), having a thickness between 0.5 cm and 1.0 cm. The thickness of the scintillating crystal is determined by the stopping power of the crystal for the gamma ray energies of interest, while the other dimensions of the crystal can be as large as necessary for the imaging tasks to be performed. The crystal 24 has first and second arrays 30 of photodiodes 32 on both opposing surfaces thereof. The photodiodes 32 are preferably silicon drift photodiodes, but may be constituted by any equivalent type of photodiode characterized by low capacitance and low noise. Avalanche-type diodes meeting the necessary requirements may also be used. FIG. 2 shows a plan view of the array 30 of photodiodes 32 disposed adjacent the surface of the crystal. In a preferred embodiment, the photodiode arrays are mounted directly to the crystal surface. Although illustrated as being square, the photodiodes 32 may be round, rectangular, hexagonal or any other suitable shape.

The photodiodes are relatively thin and essentially transparent to incident gamma rays having energies of interest in nuclear medical imaging (i.e., 70–200 keV and preferably 140 keV), and therefore placing an array of photodiodes on the side of the crystal to which the gamma rays are incident is tolerable, as the photodiodes will not significantly attenuate the flux of gamma rays reaching the crystal for interaction therewith.

Each photodiode 32 is coupled to a preamplifier 36 and electronic computing circuitry 38 for measuring the amplitude of the signal produced in each photodiode in response to the receipt of scintillation photons from the crystal as a result of a gamma ray absorption event. The amplitude of such signals is proportional to the number of scintillation photons detected by each photodiode in the arrays.

Figure 3:
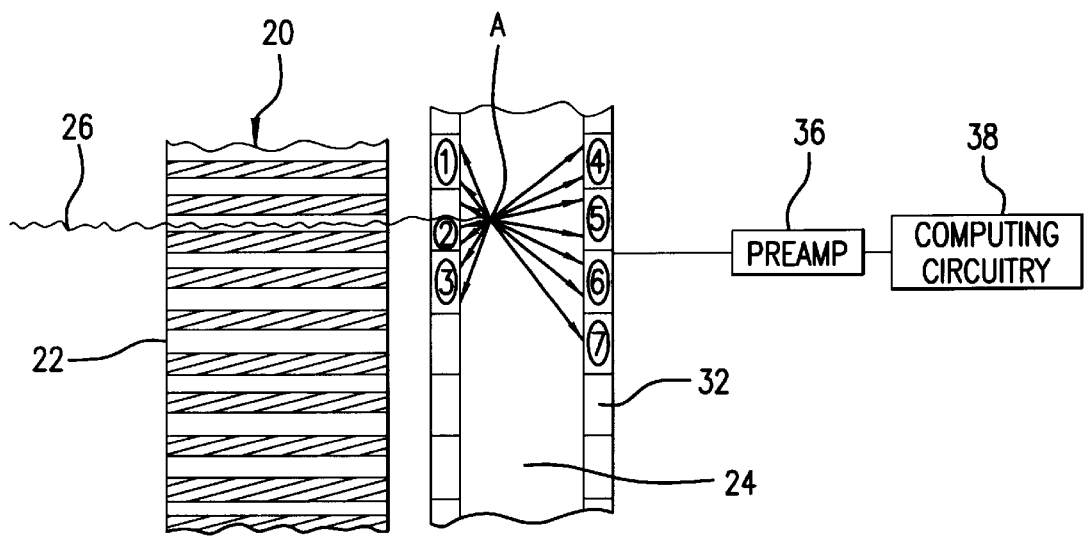
FIG. 3 is a part-schematic part-sectional view of a gamma ray imaging detector according to a preferred embodiment of the present invention.

As shown in FIG. 3, typically a collimator 20 is positioned between the imaging detector and a source of gamma radiation. The collimator includes a plurality of parallel holes 22. As mentioned above, the number of scintillation photons reaching each photodiode is dependent on the solid angle subtended by the area of that photodiode to the point of gamma ray interaction within the crystal. Therefore, the largest number of scintillation photons is received by the photodiode closest to the absorption event, which consequently produces the largest signal.

Figure 4A:
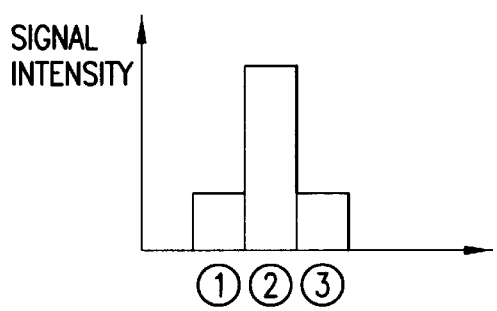
FIGS. 4A and 4B are graphs illustrating the relative signal intensities of the photodiode detectors of FIG. 3 in response to a particular gamma ray absorption event.
Figure 4B:
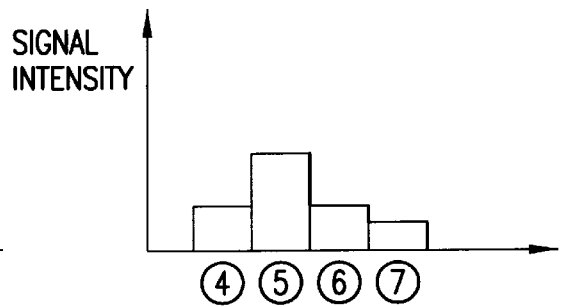

FIG. 3 illustrates a gamma ray 26 passing through the collimator 20 and being absorbed within the crystal 24 at a point A within the crystal. The relative signal intensities produced by photodiodes 1–7 in response to such an event is shown in FIGS. 4A–4B. The depth of interaction or DOI can be estimated from the relative signal intensities measured from the photodiodes in view of the proportionality which exists between the signal intensity and the solid angle subtended by each photodiode. The photodiode array closest to the absorption event, in this case the array closest to the collimator 20, records a signal intensity distribution which is heavily weighted to the single photodiode closest to the event (in the example, photodiode 2). Conversely, the distribution of signal intensities for the array on the far surface of the crystal is less peaked (and more spread out) because the scintillation photons have spread to a greater number of photodiodes, with the area of each such photodiode subtending a smaller solid angle relative to the event position within the crystal than the areas of the photodiodes in the closer array.

The depth of interaction can be determined directly from the different relative shapes of the signal intensity distributions produced by the two arrays of photodiodes positioned on opposite sides of the scintillating crystal surface. The present invention thus provides a significant advantage over conventional gamma ray cameras using scintillation photon detectors on only one side of the crystal.

The invention having been thus described, it will apparent to those skilled in the art that the same may be varied in many ways without departing from the spirit and scope of the invention. Any and all such modifications are intended to be included within the scope of the following claims.

What we claim is:

1. A gamma ray imaging detector comprising:

a scintillating crystal responsive to an incident gamma ray for producing a plurality of scintillation photons;

a first array of photodiodes being positioned adjacent one surface of said scintillating crystal for receiving a first portion of said plurality of scintillation photons; and a second array of photodiodes being positioned adjacent a second surface of said scintillating crystal opposite said one surface for receiving a second portion of said plurality of scintillation photons;

each of said photodiodes in said first and second arrays generating an electrical output signal proportional to the number of scintillation photons received, and said first and second arrays being arranged such that at least one photodiode from each array receives scintillation photons produced by any incident gamma ray in said scintillating crystal.

2. A gamma ray imaging detector according to claim 1, further comprising computing circuitry responsive to electrical output signals from said first and second arrays of photodiodes for measuring the depth of interaction of said incident gamma ray within said scintillating crystal.

3. A gamma ray imaging detector according to claim 1, wherein said scintillating crystal comprises a thallium doped cesium iodide crystal.

4. A gamma ray imaging detector according to claim 1, wherein said first and second arrays of photodiodes comprise silicon drift photodiodes.

5. A gamma ray imaging detector according to claim 1, wherein said first and second arrays of photodiodes comprise avalanche photodiodes.

6. A gamma ray imaging detector according to claim 1, wherein said first array of photodiodes is mounted directly to said one surface of said scintillating crystal.

7. A gamma ray imaging detector according to claim 1, wherein said second array of photodiodes is mounted directly to said second surface of said scintillating crystal.

8. A method of measuring the depth of interaction of an incident gamma ray within a scintillating crystal of a gamma ray imaging detector, said interaction resulting in the generation of a plurality of scintillation photons, comprising the steps of:

providing a first array of photodiodes adjacent a first surface of said scintillating crystal so as to receive a first portion of said plurality of scintillation photons generated by said interaction;

providing a second array of photodiodes adjacent a second surface of said scintillating crystal opposite said first surface so as to receive a second portion of said plurality of scintillation photons generated by said interaction;

each of said photodiodes in said first and second arrays generating an electrical output signal proportional to the number of scintillation photons received; and calculating the depth of interaction of said incident gamma ray within said scintillating crystal as a function of the amplitudes of said electrical output signals generated by said first and second arrays of photodiodes.

9. A method according to claim 8, wherein said scintillating crystal comprises a thallium doped cesium iodide crystal.

10. A method according to claim 8, wherein said first and second arrays of photodiodes comprise silicon drift photodiodes.

11. A method according to claim 8, wherein said first and second arrays of photodiodes comprise avalanche photodiodes.

12. A method according to claim 8, wherein said first array of photodiodes is mounted directly to said one surface of said scintillating crystal.

13. A method according to claim 8, wherein said second array of photodiodes is mounted directly to said second surface of said scintillating crystal.

* * * * *